(12) United States Patent
Perronnin et al.

(10) Patent No.: US 8,463,051 B2
(45) Date of Patent: Jun. 11, 2013

(54) MODELING IMAGES AS MIXTURES OF IMAGE MODELS

(75) Inventors: Florent C. Perronnin, Domene (FR); Yan Liu, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1112 days.

(21) Appl. No.: 12/252,531

(22) Filed: Oct. 16, 2008

(65) Prior Publication Data

US 2010/0098343 A1    Apr. 22, 2010

(51) Int. Cl.
*G06K 9/62* (2006.01)
*G06K 9/74* (2006.01)
*G06K 9/32* (2006.01)

(52) U.S. Cl.
USPC ............ 382/224; 382/225; 382/228; 382/294

(58) Field of Classification Search
None
See application file for complete search history.

(56) References Cited

U.S. PATENT DOCUMENTS

| | | | |
|---|---|---|---|
| 7,124,149 B2 | 10/2006 | Smith et al. | |
| 2003/0147558 A1* | 8/2003 | Loui et al. | 382/225 |
| 2003/0169908 A1 | 9/2003 | Kim et al. | |
| 2007/0005356 A1 | 1/2007 | Perronnin | |
| 2007/0258648 A1 | 11/2007 | Perronnin | |
| 2007/0299667 A1* | 12/2007 | Netsch et al. | 704/243 |
| 2008/0069456 A1 | 3/2008 | Perronnin | |
| 2008/0144068 A1 | 6/2008 | Digby | |
| 2009/0157398 A1* | 6/2009 | Kim et al. | 704/226 |

FOREIGN PATENT DOCUMENTS

| | | |
|---|---|---|
| EP | 1 343 107 | 9/2003 |
| JP | 2004005456 | 1/2004 |
| JP | 4271964 | 6/2009 |

OTHER PUBLICATIONS

Perronnin et al.; "Adapted Vocabularies for Generic Visual Categorization", Computer Vision ECCV 2006, vol. 3954, pp. 464-475.*
Tang et al.; "A vectorial image classification method based on neighborhood weighted Gaussian mixture model", Engineering in Medicine and Biology Society, 2008. EMBS 2008. 30th Annual International Conference of the IEEE, pp. 1922-1925.*
Greenspan, et al. "Context-dependent segmentation and matching in image databases," Computer Vision and Image Understanding, Academic Press, vol. 93. No. 1, Jan. 1, 2004, pp. 86-109.
Morsillo, et al. "Mining the Web for Visual Concepts," MDM/KDD Aug. 24, 2008, © 2008 ACM.
Farquhar, et al. "Improving bag-of-keypoints image and categorization: Generative models and pdf kernels," Technical Report, University of Southampton, Feb. 17, 2005, pp. 1-17.
U.S. Appl. No. 11/767,739, filed Jun. 25, 2007, Bressan, et al.
U.S. Appl. No. 11/801,230, filed May 9, 2007, Marchesotti, et al.
U.S. Appl. No. 11/947,859, filed Nov. 30, 2007, Liu, et al.
U.S. Appl. No. 12/033,434, filed Feb. 19, 2008, Csurka.
U.S. Appl. No. 12/049,520, filed Mar. 17, 2008, Marchesotti, et al.

(Continued)

*Primary Examiner* — Matthew Bella
*Assistant Examiner* — Thomas Conway
(74) *Attorney, Agent, or Firm* — Fay Sharpe LLP

(57) ABSTRACT

A system and method for generating an image representation are provided. The image is modeled as a set of mixture weights, one for each of a set of reference image models, such as Gaussian mixture models (GMMs). The weights are derived by optimizing an objective function in which each reference image model is associated with its respective weight.

20 Claims, 5 Drawing Sheets

OTHER PUBLICATIONS

U.S. Appl. No. 12/123,511, filed May 20, 2008, Marchesotti, et al.
U.S. Appl. No. 12/123,586, filed May 20, 2008, Marchesotti.
U.S. Appl. No. 12/175,857, filed Jul. 18, 2008, Marchesotti.
U.S. Appl. No. 12/191,579, filed Aug. 14, 2008, Csurka, et al.
Bosch, et al, Scene Classification Via pLSA, *ECCV*, 2006.
Csurka, et al., Visual Categorization with Bags of Keypoints, *ECCV Workshop on Statistical Learning in Computer Vision*, 2004.
Goldberger, et al., An Efficient Image Similarity Measure based on Approximations of KL-Divergence Between Two Gaussian Mixtures, *ICCV*, 2003.
Hofmann, Unsupervised Learning by Probabilistic Latent Semantic Analysis, *Journal of Machine Learning*, vol. 42, pp. 177-196, 2001.
Pekalska, et al., A Generalized Kernel Approach to Dissimilarity-Based Classification, *Journal of Machine Learning Research*, Special Issue on Kernel Methods, vol. 2, No. 2, 175-211, 2002.
Quelhas, et al., Modeling Scenes with Local Descriptors and Latent Aspects, *ICCV*, vol. 1, pp. 883-890 (2005).
Rasiwasia, et al., Bridging the Gap: Query by Semantic Example, *IEEE Trans. on Multimedia*, 2007.
Vasconcelos, et al., Learning Mixture Hierarchies, *NIPS*, 1998.

\* cited by examiner

MODELING IMAGES AS MIXTURES OF IMAGE MODELS

CROSS REFERENCE TO RELATED PATENTS AND APPLICATIONS

The following copending applications, the disclosures of which are incorporated herein by reference in their entireties, are mentioned:

U.S. application Ser. No. 11/947,859, filed Nov. 30, 2007, entitled OBJECT COMPARISON, RETRIEVAL, AND CATEGORIZATION METHODS AND APPARATUSES, by Yan Liu and Florent Perronnin;

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/245,939, filed Oct. 6, 2008, entitled FAST ALGORITHM FOR CONVEX OPTIMIZATION WITH APPLICATION TO DENSITY ESTIMATION AND CLUSTERING, by Florent Perronnin, et al.

BACKGROUND

The exemplary embodiment relates to image characterization. It finds particular application in connection with an apparatus and method for generation of an image representation as a mixture of a set of reference images. Implementations of the apparatus and method include image retrieval, image categorization, and image clustering applications, but it is to be appreciated that they are not limited to such applications.

Various image processing applications, such as retrieval, categorization, clustering, image enhancement, and the like, are becoming increasingly important given the widespread use of digital images. For example, for some applications, it would be helpful to retrieve images of a particular type of object, such as cars, from a database of images. In another application, given an image, it would be useful to identify and retrieve similar images from an image database. In other applications, given a large group of images, it would be useful to cluster them into a set of classes, based on content similarity.

To enable such techniques to be performed automatically or semi-automatically, some mechanism for automated image characterization based on the content of the image is desirable. Since a digital image is essentially in the form of pixel values, e.g., colorant values, for each of typically millions of pixels, image characterization techniques typically rely on extracting features from the image based on small segments of the image, referred to as patches. Techniques have been developed for categorizing images which rely on training a classifier, or set of classifiers, with information extracted from a large number of training images. The training images are manually labeled with one or more of a set of predefined object categories, such as person, landscape, animal, building, and the like. The classifier learns how to characterize a new image based on its extracted features and the extracted features of the labeled images. Such techniques, however, are manually intensive in the training phase, often requiring the manual labeling of a large number of images for each class for which the classifier is to be trained. Additionally, adding a new category generally involves considerable retraining of the classifier.

In processes which rely on identifying similar images, images may be characterized using a high level representation that is generated from the extracted low level features. It is known to model images using parameterized models. A Gaussian model, for example, characterizes an image using a Gaussian distribution representative of low level image features and having a mean vector and covariance matrix parameters. Characterizing the image by a single Gaussian component provides for straightforward comparison of different images, for example by comparing the mean vectors and covariance matrices of the two image models. However, a distribution having a single Gaussian component contains limited descriptive content and may be insufficient to adequately describe images. In other approaches, a mixture model is employed to characterize an image. For example, a Gaussian mixture model (GMM) describes the low level features distribution for an image using a weighted combination of Gaussian components each having mean vector and covariance matrix parameters.

A GMM or other mixture model has advantages in that it provides a higher number of components by which to characterize the image. On the other hand, it becomes more difficult to assess the similarity between images. For example, two images that are in reality quite similar may be fitted with very different sets of mixture model parameters, due to sparseness of the feature vectors sets extracted from the images. In such a case, the computed distance between the mixture models for the two images will be large, and the images will erroneously be deemed to be quite different.

In addition to this robustness problem, the use of mixture models can make image comparison computationally intensive. For example, in some studies it has been estimated that a GMM having about 128 Gaussian components is desirable to characterize an image sufficiently. A comparison of two images would thus entail pairwise comparison of each set of 128 Gaussian components, leading to about 16,000 Gaussian comparison operations, making it computationally too expensive for many applications.

The exemplary embodiment provides an apparatus and method for generation of a representation of an image which is both robust and easy to use and which can be generated largely automatically.

INCORPORATION BY REFERENCE

The following references, the disclosures of which are incorporated herein in their entireties by reference, are mentioned.

U.S. Pub. No. 2007/0005356, entitled GENERIC VISUAL CATEGORIZATION METHOD AND SYSTEM, U.S. Pub. No. 2007/0258648, entitled GENERIC VISUAL CLASSIFICATION WITH GRADIENT COMPONENTS-BASED DIMENSIONALITY ENHANCEMENT, and U.S. Pub. No. 2008/0069456 entitled BAGS OF VISUAL CONTEXT-DEPENDENT WORDS FOR GENERIC VISUAL CATEGORIZATION, all by Florent Perronnin, and G. Csurka, C. Dance, L. Fan, J. Willamowski and C. Bray, "Visual Categorization with Bags of Keypoints," ECCV workshop on Statistical Learning in Computer Vision, 2004, disclose systems and methods for categorizing images based on content.

U.S. Pub. No. 2008/0144068, published Jun. 19, 2008, entitled PRINTER WITH IMAGE CATEGORIZATION CAPABILITY, by Anthony Digby, discloses a printer which prints images according to an image content-based category.

U.S. Pat. No. 7,124,149, issued Oct. 17, 2006, entitled METHOD AND APPARATUS FOR CONTENT REPRESENTATION AND RETRIEVAL IN CONCEPT MODEL SPACE, by Smith, et al., discloses a method and apparatus for extracting a model vector representation from multimedia documents. A model vector provides a multidimensional representation of the confidence with which multimedia documents belong to a set of categories or with which a set of semantic concepts relate to the documents. The model vector can be associated with multimedia documents to provide an index of its content or categorization and can be used for comparing, searching, classifying, or clustering multimedia documents.

BRIEF DESCRIPTION

In accordance with one aspect of the exemplary embodiment, a method for generating an image representation is provided. The method includes modeling an original image as a mixture of reference image models in which the original image is represented by a set of mixture weights comprising a mixture weight for each of the reference image models.

In accordance with another aspect of the exemplary embodiment, a computer implemented apparatus for generating an image representation is provided. The apparatus includes memory which stores a set of reference image models and an image representation generator which outputs a representation of an original image as a mixture of the reference image models in which the original image is described by a set of mixture weights comprising a mixture weight for each of the reference image models.

In accordance with one aspect of the exemplary embodiment, a method for generating an image representation includes modeling each of a set of references images as a Gaussian mixture model based on features extracted from the reference image. The method further includes modeling an original image as a mixture of the reference image Gaussian mixture models by optimizing an objective function in which each of the Gaussian mixture models is associated with a respective weight and outputting the weights of the optimized objective function as the image representation.

DETAILED DESCRIPTION

The exemplary embodiment relates to an apparatus, a method, and a computer program product for generating an image representation of an original image. Reference images are first individually modeled. The original image is then modeled as a mixture of these reference images, or more precisely, their models. The image representation can be a vector of mixture weights, one weight for each of the reference image models. This representation may be used for a variety of applications, including retrieval, categorization and clustering.

Original images to be characterized in this way may be received by the apparatus in any convenient file format, such as JPEG, GIF, JBIG, BMP, TIFF, or other common file format used for images and which may optionally be converted to another suitable format prior to processing. Images may be individual images or video images and can be scanned images, photographs, graphics, text images, combinations thereof, or the like. In general, each input digital image includes image data for an array of pixels forming the image and may be in the form of a bitmap. The image data may include colorant values, such as grey levels, for a single color separation (e.g., for black and white images) or for each of a set of color separations, such as RGB, or be expressed in another other color space in which different colors can be represented. In general, the colorant values can be the optical density value of any single color channel, however expressed (RGB, L*a*b*, YCbCr, etc.).

Figure 1:
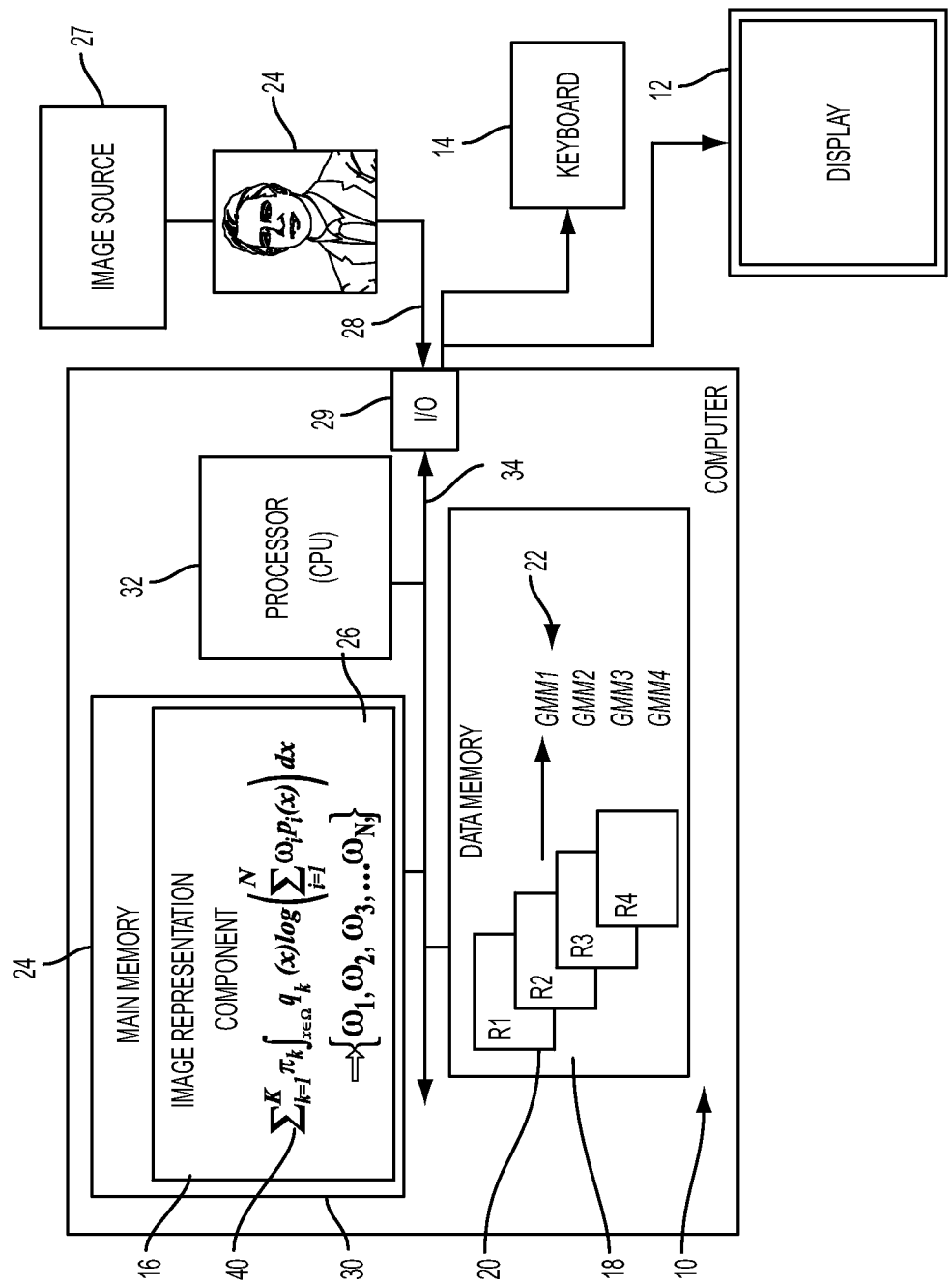
FIG. 1 is a functional block diagram of an exemplary apparatus for generating a representation of a digital image.

With reference to FIG. 1, an exemplary apparatus for generating an image representation is illustrated. The apparatus may be embodied in one or more electronic processing devices, such as the illustrated computer 10. The computer may include a display 12 or other output device for displaying or otherwise generating a human-perceptible output and a keyboard 14 or other user input device for receiving user input. The computer 10 is configured to implement an image representation generator 16 for generating a representation of an original input image. The electronic processing device 10 may be the illustrated computer 10, or another electronic processing device such as a network server, Internet-based server, personal data assistant (PDA), cellular telephone, or the like. The computer 10 includes data memory 18 for storing a set of reference images 20 (labeled R1, R2, R3, R4) as image data and/or information extracted therefrom, such as a set of reference models 22 (labeled GMM1, GMM2, GMM3, GMM4). The computer 10 is configured for receiving an original image 24 for which a representation is sought and storing the image in memory such as data memory 18 and for storing and/or outputting a representation 26 of the image generated by the image representation generator 16. The image 24 can be input from any suitable image source 27, such as a workstation, database, scanner, or memory storage device, such as a disk, camera memory, memory stick, or the like. The source 27 may be temporarily or permanently communicatively linked to the computer 10 via a wired or wireless link 28, such as a cable, telephone line, local area network or wide area network, such as the Internet, through a suitable input/output (I/O) connection 29, such as a modem, USB port, or the like.

The image representation generator 16 may be embodied in hardware or software or a combination thereof. As shown, the representation generator 16 is in the form of software components stored in main memory 30 of the computer and which are executed by an associated processor 32, such as the computer's central processing unit (CPU). The components 18, 30, 32, of the computer 10 may communicate via a data control bus 34. Memories 18, 30 may be separate or combined and may be in the form of any type of computer readable medium such as random access memory (RAM), read only memory (ROM), magnetic disk or tape, optical disk, flash memory, holographic memory, or suitable combination thereof.

The exemplary image representation generator 16 includes instructions for generating a representation of the image 24. As will be described in greater detail below, these instructions include instructions for estimating mixture weights $\omega_i$ of an objective function 40 in which the reference models 22 of the set of reference images 20 are each associated with a respective weight $\omega_i$, and for outputting the set of mixture weights as a representation 26 of the original image. More particularly, the image representation generator 16 receives a log-likelihood function 40, which may be of the form given in Equation (1) below, and optimizes the N adjustable weight parameters $\omega_i$ (one for each reference image) to generate an optimized log-likelihood function. The weights $\omega_i$ of the optimized log-likelihood function are stored as a representation 26 of the original image. The weights $\omega_i$ represent the relative contributions of the reference image models to that of the original image.

As used herein, the terms "optimize," "maximize," and similar phraseology are intended to be broadly construed as encompassing not only an absolute optimum or an absolute maximum, but also an optimum or maximum that is close to, but not precisely, the global optimum or maximum, or an optimum or maximum that is a local optimum or maximum but not a global optimum or maximum. For example, an iterative process may be used to optimize the log-likelihood function respective to the parameters $\omega_i$. In doing so, the iterative algorithm may be terminated based on stopping criteria that causes the algorithm to stop the optimization at a point at which the log-likelihood function is not yet at the absolute global maximum. Such optimization is said to optimize the log-likelihood function respective to the parameters $\omega_i$, even though the final value of the log-likelihood function may not be the absolute largest value attainable by adjustment of the parameters $\omega_i$. Similarly, some optimization algorithms disclosed or employed herein may converge to a locally optimal value rather than to the globally optimal value. Again, such optimization algorithms are said to optimize the parameters $\omega_i$, even though the final value may not be the absolute optimum value.

Figure 2:
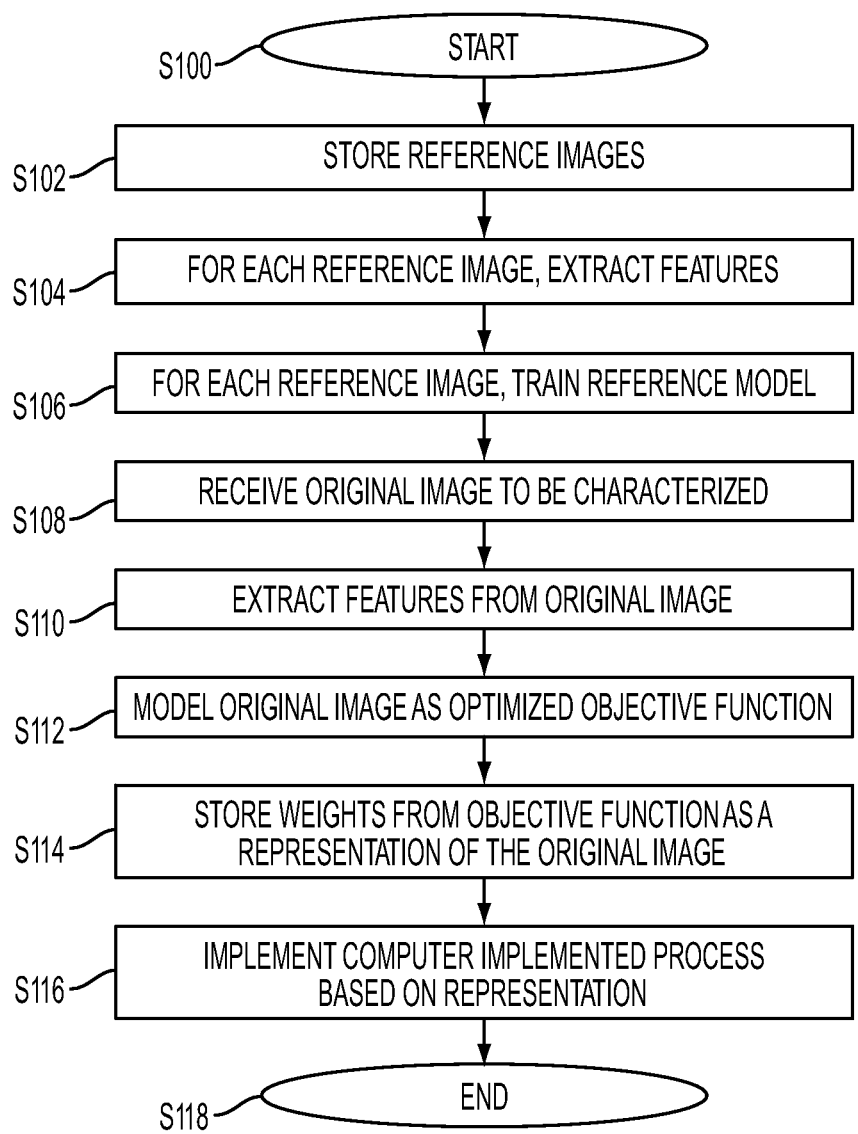
FIG. 2 is a flow diagram of an exemplary method for generating a representation of a digital image, which may be performed with the apparatus of FIG. 1.

An exemplary method for generating an image representation 26 is briefly outlined in FIG. 2. The method begins at S100.

At S102, a set of reference images 20 are received and may be stored in data memory 18 during processing.

At S104, for each reference image 20, a set of low level features are extracted. These features may be extracted from a set of patches (regions) of the image. The patches may be obtained at keypoints, randomly, or on a regular grid, e.g., at multiple scales, as described, for example, in above-mentioned U.S. Pub. Nos. 2007/0005356, 2007/0258648, and 2008/0069456. The low level features extracted may be gradient features, pixel colors, grey levels, or the like and may be concatenated to form a feature vector or feature matrix for each patch. Two or more types of low level features may be extracted from the image, resulting in two or more feature vectors. The dimensionality of the feature vectors may be reduced using principal component analysis (PCA).

At S106, for each reference image 20, a reference model 22 is trained, based on the extracted features (feature vectors). In various implementations described herein, each reference model 22 is a probability density function which describes a set of continuous or discrete probability distributions. As an example, each reference model is a Gaussian Mixture Model (GMM) which employs continuous probability distributions. In another implementation, the reference model is a multinomial distribution, which employs discrete probability distributions. However, other mixture models may alternatively be used, such as for example a mixture model including for example some Gaussian distribution components and some Laplace distribution components.

At S108 an original image 24 to be modeled is received and stored.

At S110, low level features of the original image 24 are extracted in a similar way to that described for the reference images 20 (S104).

At S112, the original image 24 is modeled by optimizing an objective function 40 in which each reference image is represented by its probability density function (e.g., its GMM) and an associated weight $\omega_i$.

At S114, the weights of the optimized objective function are stored and/or output, e.g., as a mixture weight vector 26, which serves as a representation of the image 24. Where more than one type of feature is used as the low level feature, a mixture weight vector may be generated for each feature type.

Figure 3:
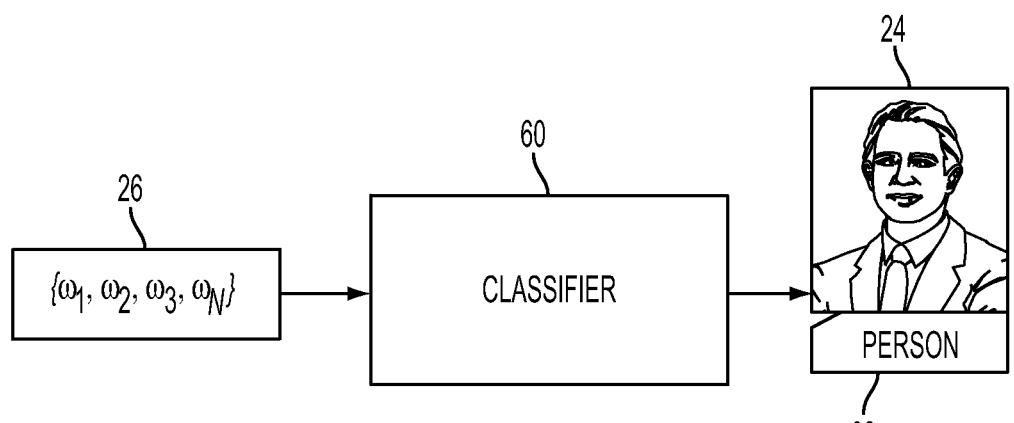
FIG. 3 is a block diagram illustrating an exemplary classifier which may receive as input an image representation generated by the apparatus of FIG. 1.

At S116, a computer implemented process may be performed which utilizes the mixture weight vector 26 thus obtained. For example, the mixture weight vector for one image can be compared with the mixture weight vector(s) of one or more other images, derived in the same way, for clustering or similarity determinations. In other embodiments an image 24 may be classified by inputting its mixture weight vector 26 into a classifier 42 (FIG. 3) which has been trained on the mixture weight vectors of a set of manually labeled training images. The classifier labels the image with a class label 44 corresponding to one of the image classes on which the classifier has been trained.

The method ends at S118.

Figure 4:
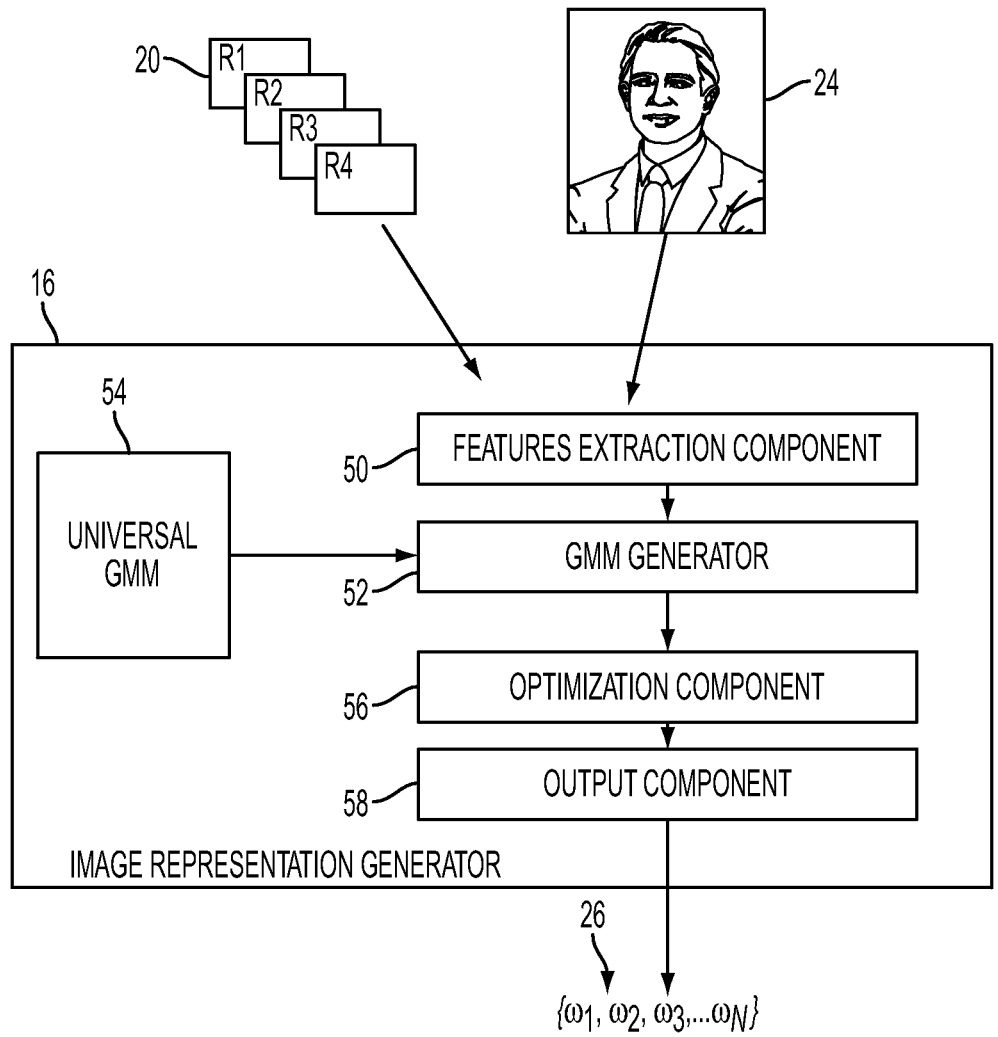
FIG. 4 is a block diagram illustrating an exemplary image representation generator of the apparatus of FIG. 1.

FIG. 4 is a functional block diagram of an exemplary image representation generator 16 and the components which it may include for performing the exemplary method. As will be appreciated, the components may be software components that may be suitably combined or split into subcomponents. The image representation generator 16 includes a features extraction component 50 which extracts features from images, such as the reference images 20 and original image 24 (S104 and S110). A reference image model generator 52 generates a Gaussian Mixture Model 22 (or other probability model) for each reference image and for the original image, based on the extracted features, e.g., starting with a trained universal GMM 54. An optimization component 56 optimizes an objective function 40 by optimizing weights for the reference image GMMs 22. An output component 58 outputs a vector for the original image comprising the set of optimized weights.

The exemplary method (and representation generator) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for generating an image representation.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The following aspects of the method and apparatus are covered in the sections below. Section A introduces a set of notations and provides the mathematical framework for one implementation of the method. Sections B and C provide two optimization strategies which may be employed to compute the image representation, i.e., the mixture weights of the log-likelihood function. In Section D, issues of convergence are discussed. It will be noted that Sections A to D focus on the case where images are modelled as continuous distributions (GMMs). In Section E, an alternative implementation is discussed for the case where an image is modelled as a multinomial distribution. In section F, various applications of the image representation are discussed.

A. Notations and Mathematical Framework

In one implementation, the images (reference images and original image) are modeled as mixture models, typically Gaussian Mixture Models (GMMs). In the exemplary system, the GMM describing an image I is estimated from the set of low-level feature vectors extracted from I. The density of low-level features in the image is estimated and represented by a mixture of distribution functions (Gaussians). The GMM is thus a weighted mixture of Gaussians representative of the low level image features, each Gaussian having a mean vector and covariance matrix parameters. Each image is described in terms of a set of Gaussians. In one embodiment, the GMM for each image 20, 24 is generated by adaptation of a universal GMM 54, as described, for example, in above-referenced application Ser. No. 11/947,859, incorporated by reference. The universal GMM is first trained on a large number of patches extracted from a large number of images (not limited to the images in the reference set). The universal GMM is then adapted by training the universal GMM with the patches extracted from the image in question.

In the following discussion, let K represent the number of Gaussians in the original GMM and let $K_i$ represent the number of Gaussians in the i-th reference image. K and $K_i$ may suitably be, for example, at least 15 or at least 20, e.g., about 40 or more, and can be up to for example, about 1,000 or more, e.g., less than about 500. Let N represent the number of reference images 20. N may suitably be at least 10 or at least 20, e.g. at least 50 and in some embodiments, up to 1000 or 5000 or more, e.g., up to about 1,000,000.

Let q denote the mixture model of the image 24 to be described. Therefore, $$q = \sum_{k=1}^{K} \pi_k q_k,$$

where $q_k$ represents the kth Gaussian and $\pi_k$ its weight in the GMM. The probability density function of the i-th reference image is denoted $$p_i = \sum_{k=1}^{K} \pi_{i,k} p_{i,k}.$$

where $p_{i,k}$ represents the kth Gaussian of the i-th reference image and $\pi_{i,k}$ its weight.

A representation of the image 24 as a weighted combination of the N reference images can suitably be obtained by estimating the mixture weights $\omega_i$ which maximize the following cost function:

$$E_q\left[\log\left(\sum_{i=1}^{N} \omega_i p_i\right)\right] = \int_{x \in \Omega} q(x) \log\left(\sum_{i=1}^{N} \omega_i p_i(x)\right) dx \quad (1)$$

$$= \sum_{k=1}^{K} \pi_k \int_{\pi \in \Omega} q_k(x) \log\left(\sum_{i=1}^{N} \omega_i p_i(x)\right) dx$$

where, $E_q$ represents the expectation under q, and Ω is the space of the low-level feature vectors extracted from the original and reference images.

The optimization may be performed under the following two constraints:

$$\omega_i \geq 0, \forall i \quad (2)$$

$$\sum_{i=1}^{N} \omega_i = 1 \quad (3)$$

The first constraint avoids negative weights. The second constraint requires that all the weights sum to a specific value (here, 1).

The weights in the representation 26 of the image can be concatenated as a vector $\{\omega_1, \omega_2, \omega_3, \ldots \omega_N\}$. The function provided in Eqn. 1 is optimized, when $$\sum_{i=1}^{N} \omega_i p_i$$

is most similar to q. Other optimization functions can, of course be used in place of Eqn. 1. Suitably, any function which measures a similarity between q and $$\sum_{i=1}^{N} \omega_i p_i$$

may be used. The function could be of different forms. As an example, the objective function could be of the form $$\int_x \sqrt{q(x) \times \left(\sum_{i=1}^{N} \omega_i p_i(x)\right)} \, dx.$$

While Eqn. 1 is a convex objective function, its direct optimization is difficult. Accordingly, an approximation method is conveniently employed to estimate the weights $\omega_i$. In the following discussion, two approximation methods are described by way of example, which both rely on Expectation Maximization algorithms. In the first, described in Section B, it is assumed that the system 16 has access to a set of feature vectors X distributed according to q. In the second, described in Section C, it is assumed that the system only has access to q. Other optimization methods may include gradient descent or Maximum a Posteriori (MAP) methods (see, for example, section D). Another optimization method which may be utilized herein is described in copending application Ser. No. 12/245,939.

B. Sampling Approximation

Let $X=\{x_1, t=1 \ldots T\}$ be a set of low-level feature vectors distributed according to q. This is typically the set of feature vectors extracted from the image 24 to be described and which are supposed to have been generated by q in a maximum likelihood estimation (MLE) framework. If the number of samples T is large enough, the law of large numbers can be used and the objective function (1) approximated as:

$$\frac{1}{T} \sum_{t=1}^{T} \log\left(\sum_{i=1}^{N} \omega_i p_i(x_t)\right) \quad (4)$$

A suitable procedure for MLE is the Expectation Maximization (EM) algorithm, described for example in Dempster et al., "Maximum likelihood from incomplete data via the EM algorithm," *Journal of the Royal Statistical Society* (1977). The EM algorithm alternates two steps: (1) an expectation (E) step in which the posterior probabilities of mixture occupancy (also referred to as occupancy probabilities) are computed based on the current estimates of the parameters; and (2) a maximization (M) step in which the parameters are updated based on the expected complete data log-likelihood which depends on the occupancy probabilities computed in the E-step. In the present case, the EM algorithm is used to estimate the $\omega_i$'s.

The E-step may suitably include computing the occupancy probabilities $\gamma_i(x_t)$ (the probability for observation $x_t$ to have been generated by the i-th reference GMM):

$$\gamma_i(x_t) = \frac{\omega_i p_i(x_t)}{\sum_{j=1}^{N} \omega_j p_j(x_t)} \quad (5)$$

The M-step gives the following estimates:

$$\hat{\omega}_i = \frac{1}{T} \sum_{t=1}^{T} \gamma_i(x_t) \quad (6)$$

Where $\hat{\omega}_i$ represents optimized values of each of the weights. As this is a convex optimization problem, there is no initialization issue. In the exemplary implementation, it is suitable to initially set $$\omega_i = \frac{1}{N}, \forall i$$

(i.e., assign the same weight to all the reference image models). During the optimization, these weights change so that they are no longer equal.

In other embodiments, other algorithms such as gradient descent can also be used in place of EM.

C. Virtual Sampling Approximation

As an alternative to the method in B, the case where q is used directly will now be considered. There are at least two reasons for using q rather than the samples X used to estimate q. One of these is that storing X usually requires significantly more space than storing q. Another advantage is that the system may incorporate in q some a priori information (see, for example, above-referenced application Ser. No. 11/947,859, in which image-GMMs are estimated with the maximum a posteriori (MAP) criterion).

For example, in an approach similar to that described in Vasconcelos and A. Lippman, "Learning mixture hierarchies," NIPS, 1998, it is assumed that the GMM q generates K blocks of "virtual" samples, each block containing a fixed number M of samples. Assume also that each component $q_k$ generates one block and thus that there is a unique hidden variable associated to each block. Let $X_k$ be the block generated by $q_k$: $X_k=\{x_{k,t}, t=1 \ldots M\}$.

If the number M of samples in each block is large enough, the objective function (1) can be approximated as follows (using again the law of large numbers):

$$\frac{1}{M} \sum_{k=1}^{K} \pi_k \log\left(\sum_{i=1}^{N} \omega_i p_i(X_k)\right) \quad (7)$$

The EM algorithm can then be used to estimate the values of the weights $\omega_i$. During the E-step, the probability $\gamma_i(X_k)$ that block $X_k$ was generated by $p_i$ may suitably be computed as follows:

$$\gamma_i(X_k) = \frac{\omega_i p_i(X_k)}{\sum_{j=1}^{N} \omega_j p_j(X_k)} \quad (8)$$

The M-step re-estimation formula may be suitably written as:

$$\hat{\omega}_i = \sum_{k=1}^{K} \pi_k \gamma_i(X_k) \quad (9)$$

The next step is to compute the $p_i(X_k)$'s. Note that:

$$\frac{1}{M} \log p_i(X_k) = \frac{1}{M} \sum_{t=1}^{M} \log p_i(x_{k,t}) \quad (10)$$

$$\approx E_{q_k}[\log p_i]$$

$$= -H(q_k, p_i)$$

where $H(q_k, p_i)$ is the cross-entropy between $q_k$ and $p_i$. Once again, the approximation is based on the law of large numbers (assuming that M is large). Thus:

$$p_i(X_k) \approx \exp[-M \times H(q_k, p_i)]. \quad (11)$$

The remaining step is to define how to compute the cross-entropy $H(q_k, p_i)$. Since $q_k$ is a mixture component (a Gaussian in the present case) and $p_i$ is a mixture model (a GMM in the present case), therefore, there is no closed-form expression for $H(q_k, p_i)$. However, an approximation may be made, similar to that used by Goldberger et al. for the Kullback-Leibler divergence (see in Goldberger, S. Gordon and H. Greenspan, "An Efficient Image Similarity Measure based on Approximations of KL-Divergence Between Two Gaussian Mixtures," ICCV, 2003). This may include approximating $p_i$ by the mode which is closest to $q_k$:

$$H(q_k, p_i) = -\int_x q_k(x)\log\left(\sum_{j=1}^{K_i} \pi_{i,j} p_{i,j}(x)\right) dx \quad (12)$$

$$\approx \min_j - \int_x q_k(x)\log(\pi_{i,j} p_{i,j}(x)) dx$$

In the present case, since q and the $p_i$ values are adapted from a common GMM, there is a direct correspondence between the Gaussians of q and the Gaussians of the $p_i$'s. Thus, $K=K_i$ for all i. Thus the expression can be written as:

$$H(q_k, p_i) \approx -\int_x q_k(x)\log(\pi_{i,k} p_{i,k}(x)) dx \quad (13)$$
$$= -\log \pi_{i,k} + H(q_k, p_{i,k})$$

There is a closed-form expression for the cross-entropy $H(q_k, p_{i,k})$ between two Gaussians. The direct correspondence reduces the cost of computing $H(q_k, p_i)$ by a factor K (see application Ser. No. 11/947,859 for a fuller description).

Note that parameter M can be readily optimized, e.g., through cross-validation. Although the previous derivations assume that M is large (to apply the law of large numbers), it has been found in practice that the optimal value for M (in terms of minimization of the error rate) may be small, e.g., less than about 10, and can conveniently be set to a value as low as 1, e.g., M=1.

D. Convergence Issues

It is sometimes the case that the image to be modeled by q is one of the reference images $p_i$. This happens when one wants to compute the representations of each of a set S of images using S as the set of reference images (for example, in a classification task). If $q=p_j$, then the objective function (1) is maximized by $\omega_j=1$ and $\omega_i=0, \forall i \neq j$. i.e., the image is characterized entirely by its own GMM. This does not provide useful information about the rest of the reference set. To avoid this issue, one of the three following strategies may be employed.

The simplest strategy is to stop the EM iterations after a small number of iterations (e.g. 1, 3 or 5), i.e., when EM has not fully converged. Although simplistic, this approach has been found to work well in practice. In the case of 1 iteration, the mixture weight estimates are just the posterior probabilities (assuming that the $\omega_i$'s were initialized uniformly).

The second strategy is to modify the constraints on $\omega_i$ and to enforce $\omega_i \leq \theta < 1$, i.e. to prevent any of the reference images from taking all the weight. The optimal $\theta$ value may be found through cross-validation.

The third strategy is to prevent any of the $\omega_i$'s going to 0. To do this, a Bayesian framework may be adopted and it is assumed that there is a prior probability on the distribution of the parameters $\omega_i$ (here the prior information is that the weights cannot be 0). This is referred to as Maximum a Posteriori (MAP) estimation. As is generally the case, a Dirichlet prior is assumed, with parameters $\{\alpha_i, i=1 \ldots N\}$. The objective function (1) then becomes:

$$\int_x q(x)\log\left(\sum_{i=1}^N \omega_i p_i(x)\right) dx + \sum_{i=1}^N \alpha_i \log(\omega_i) \quad (14)$$

The E-steps (5) and (8) are unchanged. The M-steps are modified as follows. (6) becomes:

$$\hat{\omega}_i = \frac{\sum_{t=1}^T \gamma_i(x_t) + \alpha_i}{T + \sum_{i=1}^N \alpha_i} \quad (15)$$

and (9) becomes:

$$\hat{\omega}_i = \frac{\sum_{k=1}^K \pi_k \gamma_i(X_k) + \alpha_i}{1 + \sum_{i=1}^N \alpha_i} \quad (16)$$

It is suitable to set $\alpha_i = \alpha$ and to find the optimal parameter $\alpha$ through cross-validation.

E. Multinomial Distributions

In the prior description the images were each modeled as a GMM. In another implementation, the images are modeled as a multinomial distribution. For example, an image representation based on the bag-of-visual-words (BOV) approach as described, for example, in G. Csurka, C. Dance, L. Fan, J. Willamowski and C. Bray, "Visual Categorization with Bags of Keypoints," ECCV workshop on Statistical Learning in Computer Vision, 2004 and U.S. Pub. No. 2008/0069456, incorporated by reference, may be employed. In this embodiment, an image is encoded as a histogram of visual word frequencies.

As for the GMM implementation, it is assumed that there are N reference images, but in this case, each is described with a BOV representation. Each reference BOV can be identified with an aspect of a Probabilistic Latent Semantic Analysis (PLSA) model (see, for example, T. Hofmann, "Unsupervised learning by probabilistic latent semantic analysis," Journal of Machine Learning, vol. 42, pp. 177-196, 2001, hereinafter Hofmann) Let $p_{i,j}$ be the frequency of visual-word $v_j$ in the reference image i. Let $q_j$ be the frequency of visual-word $v_j$ in the image to be described.

In such a case, the objective function (1) becomes:

$$\sum_{j=1}^M q_j \log\left(\sum_{i=1}^N \omega_i p_{i,j}\right) \quad (17)$$

The following EM-algorithm can be applied iteratively (see Hofmann):

E-step:

$$\gamma_{i,j} = \frac{\omega_i p_{i,j}}{\sum_{k=1}^N \omega_k p_{k,j}}$$

M-step:

$$\hat{\omega}_i = \sum_j \gamma_{i,j} q_j$$

F) Applications

The vector of weights 26 generated by any of the methods described above may be used as a representation of an image 24 in a variety of applications of which the following are examples:

1. Image retrieval: the distance between two images can be defined as a distance between their mixture weight vectors. Several suitable measures of similarity/distance between histograms including the dot product, the chi2 distance, the Kullback-Leibler (KL) divergence, the Jensen-Shannon divergence, and the like may be used in computing similarity. For example, a large set S of images and their corresponding vectors 26 are stored in memory. A user may input a new image or select one of the set to be used as a target image. Similar images are automatically retrieved from the set, based on the similarity of their vectors to that of the target image. For example, the system retrieves images whose vectors equal or exceed a threshold of similarity. Alternatively, the 10 images (or any other selected number) with the highest similarity measure may be retrieved from the set. The retrieved images may be presented to a user for review, e.g., on the display 12.

A component for image retrieval may be included in the representation generator or may be a separate component of the same or a separate computer.

2. Image classification: the vector representation of the image may be fed to virtually any discriminative classifier 60, as illustrated schematically in FIG. 3. Exemplary classifiers may be based on sparse logistic regression, neural networks, linear discriminant analysis, support vector machines, naive Bayes, or the like. For example, the classifier may be trained with images manually assigned to one of a set of classes, such as cars, portraits, landscapes, seascapes, urban scenes, etc. The classifier assigns a class label 62 to a new image, based on its vector representation. The classifier 60 may be included in the representation generator 16 or may be a separate component of the same computer 10 or a separate computer.

The assigned class may be used in a further computer implemented process, such as class-based automated image enhancement (see for example, U.S. application Ser. No. 11/767,739, filed Jun. 25, 2007, entitled CLASS-BASED IMAGE ENHANCEMENT SYSTEM, by Marco Bressan, et al., the disclosure of which is incorporated herein by reference in its entirety), class-based image cropping (see for example, U.S. application Ser. No. 12/033,434, filed Feb. 19, 2008, entitled CONTEXT DEPENDENT INTELLIGENT THUMBNAIL IMAGES, by Gabriela Csurka, the disclosure of which is incorporated herein by reference in its entirety), or the like.

3. Image clustering: as the image representation 26 is non-negative, it is well-suited to Probability Latent Semantic Analysis (PLSA) clustering. For example a set of images may be clustered into clusters, based on the similarity of their image representations. The computer 10 or a communicatively linked computer may include a component for image clustering.

The exemplary mixture based representation of an image is robust and easy to use, making it a useful alternative to traditional kernel-based learning or similarity- or dissimilarity-based learning techniques (see, for example, the method described in Pekalska, P. Paclik and R. Duin, "A Generalized Kernel Approach to Dissimilarity-based Classification," *Journal of Machine Learning Research, Special Issue on Kernel Methods*, vol. 2, no. 2, 175-211, 2002). One advantage of the present method over such methods is that in the prior methods, each reference object contributes independently to the representation. In the present exemplary method, the reference images contribute jointly to the image representation. An evaluation of the present method on a dataset of images has shown that the exemplary method leads to higher accuracy in a classification task.

The exemplary method also has advantages over methods such as those described in U.S. Pat. No. 7,124,149, in that the present method does not require an image to be described with respect to a set of reference concepts, but rather can be described with respect to a set of reference images. Training of semantic concepts can require a large amount of labeled data, whereas the exemplary reference images need not be labeled for many applications.

The following illustrative Example shows that compared to a similarity/dissimilarity-based representation, the exemplary image representation can lead to more accurate categorization.

EXAMPLE

In the following example, a dataset of images was used to test the accuracy of the exemplary image representation in a classification application. As the dataset, the PASCAL VOC 2007 database was used. This consists of 20 object categories: person, bird, cat, cow, dog, horse, sheep, aeroplane, bicycle, boat, bus, car, motorbike, train, bottle, chair, dining table, potted plant, sofa and TV monitor. In the dataset, there are 5,011 images for training and 4,092 for testing (assessing performance).

The measure of performance used was the average precision (AP). The mean average precision (mAP), as the mean AP over the 20 categories, is reported herein. Precision, for each class, is the number of images correctly classified by the system as a percentage of the number of images assigned to that class by the system. Average precision is the average of precisions computed after truncating the list after each of the correctly classified images, in turn (see for example, the definition available at: http://en.wikipedia.org/wiki/Information_retrieval#Average_precision_of_precision_and_recall).

The example made use of two types of low-level features: grey-level features and color features. The dimensionality of these feature vectors was reduced using principal component analysis (PCA).

The training images in the dataset were used as reference images. First, a universal model (GMM) was trained with a subset of all the training images using the method described in application Ser. No. 11/947,859. The image-GMMs were then estimated through maximum a posteriori (MAP) adaptation of the universal GMM. The reference images (labeled according to class) were used to train the classifier. Images from the testing set were classified with the trained classifier, based on their vectors. A manual assessment was made to determine whether the classification was correct.

It was found that the virtual sampling approximation (section C)) consistently outperformed the sampling approximation (section B). Accordingly, only results for the virtual sampling method are reported. The difference may be due to the fact that q incorporates a priori information. For classification, sparse logistic regression (SLR) was used.

Figure 5:
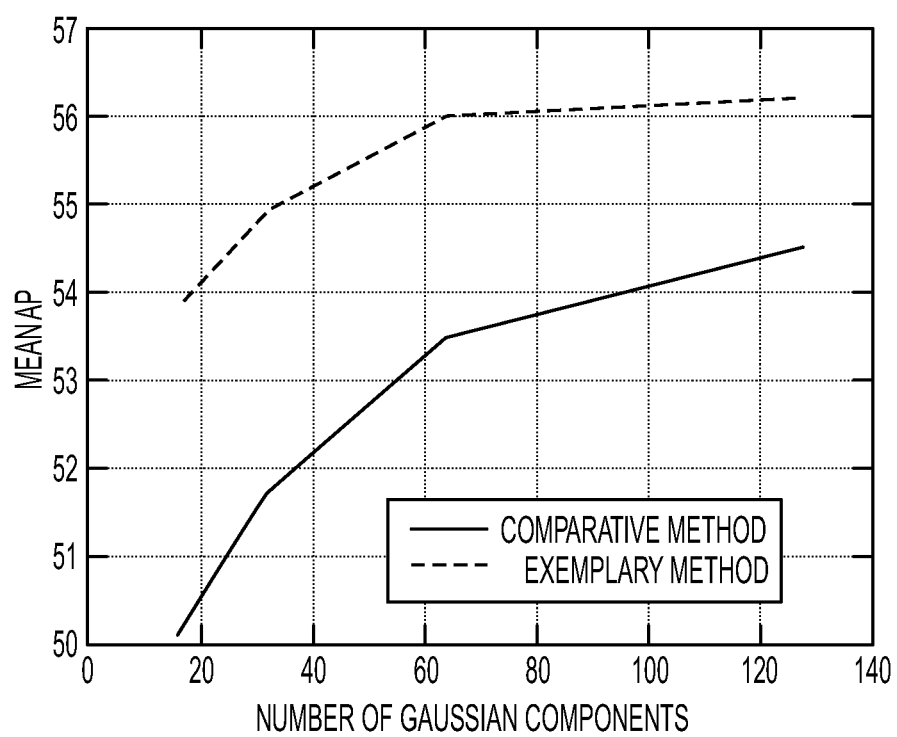
FIG. 5 is a plot of mean Average Precision vs. number of Gaussian components for a comparative method and the exemplary method.

Classification results are shown in FIG. 5 (labeled Exemplary Method). For comparison purposes, the method of application Ser. No. 11/947,859 was also used on the dataset (results are labeled Comparative method). In the comparative method, images were modeled as the vector of similarities/distances with respect to a set of reference images. The proposed measures of that approach are the KL divergence or the probability product kernel (PPK). As both measures lead to very similar results, only results for the KL divergence are reported.

The exemplary method clearly leads to an improvement of the classification accuracy as seen by higher mean average precision, especially for a small number of Gaussian components.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generating an image representation comprising:
   for each of a set of reference images, providing a reference image model which is based on features extracted from the respective reference image; and
   with a processor, modeling an original image as a mixture of the reference image models in which the original image is represented by a set of mixture weights comprising a mixture weight for each of the reference image models.

2. The method of claim 1, further comprising associating the representation comprising the set of mixture weights with the original image in memory.

3. A method of computing a similarity between images comprising generating representations of at least two original images by the method of claim 1, the method further comprising:
   computing a measure of similarity between a first of the original images and at least a second of the original images based on a first set of mixture weights for the first original image and a second set of mixture weights for the second original image, the first and second sets of mixture weights modeling the respective first and second images as a mixture of the reference image models.

4. A method of classifying images comprising:
   generating image representations for a plurality of training images by the method of claim 1;
   training a classifier based on the image representations and respective class labels of the training images; and
   with the trained classifier, assigning a class to a new image based on its image representation.

5. The method of claim 1 further comprising:
   clustering a set of images into at least two groups, each image being modeled as a set of mixture weights, the clustering being based on the sets of mixture weights.

6. A non-transitory computer program product which encodes instructions for performing the method of claim 1.

7. A computer device comprising:
   memory which stores instructions for performing the method of claim 1; and
   a processor in communication with the memory for executing the instructions.

8. The method of claim 1, wherein the reference images are each modeled as a probability density function over a set of probability distributions.

9. The method of claim 8, wherein the probability distributions are continuous probability distributions.

10. The method of claim 1, where the reference images are represented as multinomial distributions.

11. The method of claim 10, where the multinomial distributions are bags-of-visual-word representations.

12. The method of claim 1, wherein the reference image models are Gaussian Mixture Models.

13. The method of claim 12, wherein each Gaussian Mixture Model comprises weights for each of a set of Gaussian functions.

14. The method of claim 12, where the Gaussian Mixture Models are derived from a common Gaussian Mixture Model.

15. The method of claim 1, wherein the modeling comprises estimating the mixture weights by optimizing an objective function in which each reference image is represented by a weighted probability distribution.

16. The method of claim 15, wherein the optimizing includes maximizing an objective function having the general form:

$$E_q\left[\log\left(\sum_{i=1}^{N}\omega_i p_i\right)\right] = \int_{x\in\Omega} q(x)\log\left(\sum_{i=1}^{N}\omega_i p_i(x)\right)dx \quad (1)$$

$$= \sum_{k=1}^{K} \pi_k \int_{\pi\in\Omega} q_k(x)\log\left(\sum_{i=1}^{N}\omega_i p_i(x)\right)dx,$$

where $E_q$ represents the expectation under q, and $\Omega$ is the space of low-level feature vectors extracted from the original and reference images.

17. The method of claim 15, wherein the optimization is performed by one of an Expectation Maximization and gradient descent optimization.

18. A method for generating an image representation comprising:
   with a processor, modeling an original image as a mixture of reference image models in which the original image is represented by a set of mixture weights comprising a mixture weight for each of the reference image models, wherein the modeling comprises estimating the mixture weights by optimizing an objective function in which each reference image is represented by a weighted probability distribution, the original image being one of the reference images and the optimization being terminated prior to completion.

19. A computer implemented apparatus for generating an image representation comprising:
   memory which stores a set of reference image models; and
   an image representation generator which outputs a representation of an original image as a mixture of the reference image models in which the original image is described by a set of mixture weights comprising a mixture weight for each of the reference image models, the image representation generator comprising:
      a features extraction component which extracts features from images;
      a reference image model generator which generates a Gaussian Mixture Model for each reference image and for the original image, based on the extracted features;
      an optimization component which optimizes an objective function by optimizing weights for the reference image Gaussian Mixture Models; and an output component which outputs a vector for the original image comprising the set of optimized weights.

20. A method for generating an image representation comprising:
modeling each of a set of references images as a Gaussian mixture model based on features extracted from the reference image;
modeling an original image as a mixture of the reference image Gaussian mixture models by optimizing an objective function in which each of the Gaussian mixture models is associated with a respective weight; and
outputting the weights of the optimized objective function as the image representation.

* * * * *